US012812333B2

(12) United States Patent
Uniyal et al.

(10) Patent No.: US 12,812,333 B2
(45) Date of Patent: Nov. 24, 2026

(54) DEVICE IDENTIFICATION FOR DO NOT DISTURB

(71) Applicant: QUALCOMM Incorporated, San Diego, CA (US)

(72) Inventors: Aman Uniyal, Haldwani (IN); Pradeep Pant, Haldwani (IN); Sumit Gemini, Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 18/669,866

(22) Filed: May 21, 2024

(65) Prior Publication Data

US 2025/0365558 A1 Nov. 27, 2025

(51) Int. Cl.
*H04W 4/029* (2018.01)
*G01S 13/76* (2006.01)
*H04W 4/40* (2018.01)

(52) U.S. Cl.
CPC ........... *H04W 4/029* (2018.02); *G01S 13/765* (2013.01); *H04W 4/40* (2018.02)

(58) Field of Classification Search
CPC ..... H04L 1/1642; H04L 47/34; H04L 1/1607; H04L 5/001; H04L 5/0044; H04L 5/00; H04W 28/06; H04W 28/082; H04W 28/0865; H04W 28/09; H04W 76/15; H04W 88/06; H04W 72/0453; H04W 72/121; H04W 84/12; H04W 48/08; H04W 72/04; H04W 4/029; H04W 4/40; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20; G01S 13/765; G01S 7/006; G01S 13/76
See application file for complete search history.

(56) References Cited

U.S. PATENT DOCUMENTS 8,306,514 B1 * 11/2012 Nunally ............ G06Q 30/0261 455/418
12,014,100 B1 * 6/2024 Puskarich .............. G06F 3/011
2006/0109811 A1 * 5/2006 Schotten .................. G01S 1/68 370/328
2013/0210411 A1 * 8/2013 Ojha .................... H04W 8/245 455/418
2015/0072671 A1 * 3/2015 Rofougaran ......... H04B 7/0617 455/418

(Continued)

FOREIGN PATENT DOCUMENTS

EP 3940419 A1 * 1/2022 ............. G01S 11/08
EP 4328678 A1 * 2/2024 ............ G06F 30/13

(Continued)

*Primary Examiner* — Nathan S Taylor
(74) *Attorney, Agent, or Firm* — Harrity & Harrity, LLP

(57) ABSTRACT

Various aspects of the present disclosure generally relate to wireless communication. In some aspects, a first wireless device may transmit a first ultra-wideband (UWB) ranging signal. The first wireless device may receive a first UWB response from a second wireless device. The first wireless device may transmit an indication to enable do-not-disturb on the second wireless device based at least in part on a first determination, from the first UWB response, that the second wireless device is in a driver area of a vehicle. Numerous other aspects are described.

19 Claims, 8 Drawing Sheets

(56) References Cited

U.S. PATENT DOCUMENTS

| | | | | |
|---|---|---|---|---|
| 2017/0005958 | A1* | 1/2017 | Frenkel | G01S 5/0242 |
| 2018/0099643 | A1* | 4/2018 | Golsch | B60R 25/24 |
| 2018/0262888 | A1* | 9/2018 | Macneille | H04W 8/18 |
| 2019/0090123 | A1* | 3/2019 | Abraham | H04L 67/14 |
| 2020/0367035 | A1* | 11/2020 | Lee | H04W 4/70 |
| 2020/0408869 | A1* | 12/2020 | Oman | B60R 25/209 |
| 2021/0076350 | A1* | 3/2021 | Yang | H04W 52/283 |
| 2021/0099839 | A1* | 4/2021 | Chiu | G01S 5/02524 |
| 2021/0114553 | A1* | 4/2021 | Awtar | B60R 22/023 |
| 2021/0146777 | A1* | 5/2021 | Frenznick | F16D 48/06 |
| 2022/0014878 | A1* | 1/2022 | Lee | H04W 76/14 |
| 2022/0159418 | A1* | 5/2022 | Griggs | G05B 19/0426 |
| 2022/0247854 | A1* | 8/2022 | Oman | B60K 35/85 |
| 2023/0019110 | A1* | 1/2023 | Lee | G10K 11/17885 |
| 2023/0188942 | A1* | 6/2023 | Lee | H04W 4/029<br>455/41.3 |
| 2023/0262426 | A1* | 8/2023 | Bohlander | A61B 5/0004<br>455/521 |
| 2023/0406335 | A1* | 12/2023 | Petuchowski | G06Q 50/26 |
| 2024/0073474 | A1* | 2/2024 | Lynch | H04N 21/43615 |
| 2024/0308468 | A1* | 9/2024 | Golsch | B60R 25/20 |
| 2025/0056627 | A1* | 2/2025 | Reddy | H04W 4/02 |
| 2025/0088825 | A1* | 3/2025 | Movva | H04W 4/023 |
| 2025/0116768 | A1* | 4/2025 | Coors | G01S 13/878 |
| 2025/0119321 | A1* | 4/2025 | Coors | H04W 64/003 |
| 2025/0155541 | A1* | 5/2025 | Han | G01S 5/02213 |
| 2025/0282390 | A1* | 9/2025 | Cieslar | B60W 60/0025 |
| 2026/0075107 | A1* | 3/2026 | Chen | H04L 67/12 |

FOREIGN PATENT DOCUMENTS

| | | | | |
|---|---|---|---|---|
| EP | 4529147 | A1 * | 3/2025 | H04L 51/214 |
| WO | WO-2023165698 | A1 * | 9/2023 | G01S 7/006 |

* cited by examiner

DEVICE IDENTIFICATION FOR DO NOT DISTURB

FIELD OF THE DISCLOSURE

Aspects of the present disclosure generally relate to wireless communication and specifically relate to techniques, apparatuses, and methods for ultra-wideband ranging to identify a device for a do-not-disturb feature in a vehicle.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. Another example of a RAT is ultra-wideband (UWB) technology may be used to transmit signals with wide bandwidth (e.g., >500 MHz). Signal energy may be transmitted without interfering with narrowband and carrier wave transmission in the same frequency band. UWB may be used for low-energy, short-range applications, such as for ranging.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a first wireless device. The method may include transmitting a first ultra-wideband (UWB) ranging signal. The method may include receiving a first UWB response from a second wireless device. The method may include transmitting an indication to enable do-not-disturb (DND) on the second wireless device based at least in part on a first determination, from the first UWB response, that the second wireless device is in a driver area of a vehicle.

Some aspects described herein relate to a method of wireless communication performed by a second wireless device. The method may include receiving a first UWB ranging signal. The method may include transmitting a first UWB response to a first wireless device. The method may include receiving an indication to enable DND.

Some aspects described herein relate to an apparatus for wireless communication at a first wireless device. The apparatus may include one or more memories and one or more processors coupled to the one or more memories. The one or more processors may be configured to transmit a first UWB ranging signal. The one or more processors may be configured to receive a first UWB response from a second wireless device. The one or more processors may be configured to transmit an indication to enable DND on the second wireless device based at least in part on a first determination, from the first UWB response, that the second wireless device is in a driver area of a vehicle.

Some aspects described herein relate to an apparatus for wireless communication at a second wireless device. The apparatus may include one or more memories and one or more processors coupled to the one or more memories. The one or more processors may be configured to receive a first UWB ranging signal. The one or more processors may be configured to transmit a first UWB response to a first wireless device. The one or more processors may be configured to receive an indication to enable DND.

Some aspects described herein relate to a non-transitory computer-readable medium that stores a set of instructions for wireless communication by a first wireless device. The set of instructions, when executed by one or more processors of the first wireless device, may cause the first wireless device to transmit a first UWB ranging signal. The set of instructions, when executed by one or more processors of the first wireless device, may cause the first wireless device to receive a first UWB response from a second wireless device. The set of instructions, when executed by one or more processors of the first wireless device, may cause the first wireless device to transmit an indication to enable DND on the second wireless device based at least in part on a first determination, from the first UWB response, that the second wireless device is in a driver area of a vehicle.

Some aspects described herein relate to a non-transitory computer-readable medium that stores a set of instructions for wireless communication by a second wireless device. The set of instructions, when executed by one or more processors of the second wireless device, may cause the second wireless device to receive a first UWB ranging signal. The set of instructions, when executed by one or more processors of the second wireless device, may cause the second wireless device to transmit a first UWB response to a first wireless device. The set of instructions, when executed by one or more processors of the second wireless device, may cause the second wireless device to receive an indication to enable DND.

Some aspects described herein relate to an apparatus for wireless communication. The apparatus may include means for transmitting a first UWB ranging signal. The apparatus may include means for receiving a first UWB response from a second wireless device. The apparatus may include means for transmitting an indication to enable DND on the second wireless device based at least in part on a first determination, from the first UWB response, that the second wireless device is in a driver area of a vehicle.

Some aspects described herein relate to an apparatus for wireless communication. The apparatus may include means for receiving a first UWB ranging signal. The apparatus may include means for transmitting a first UWB response to a first wireless device. The apparatus may include means for receiving an indication to enable DND.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
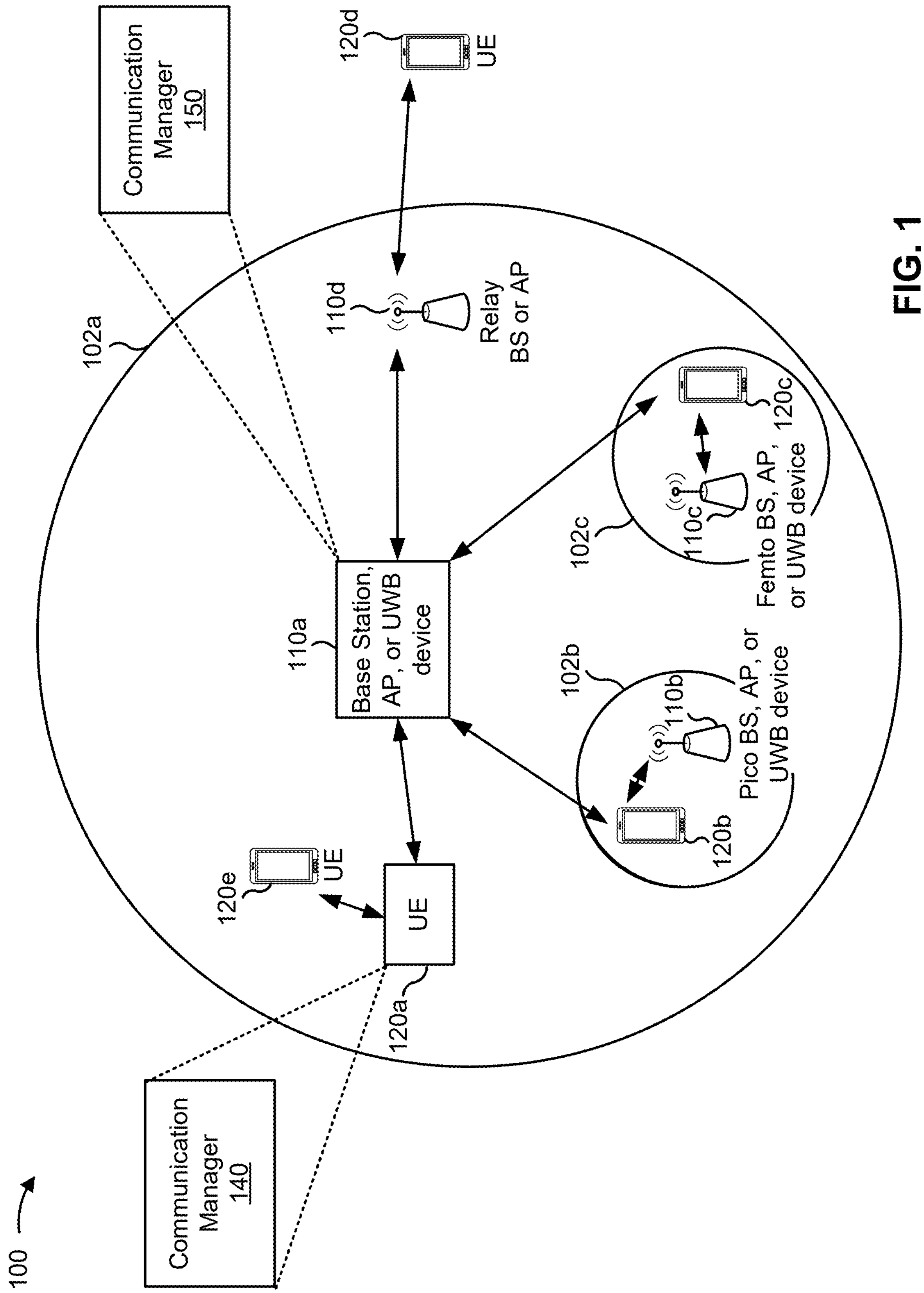
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A vehicle may include a system that offers various features, such as audio, video, navigation, internet access, or the use of other applications. Such a system may provide both information and entertainment, and thus may be referred to as an "infotainment system." The infotainment system may include or may be coupled to a wireless device (e.g., ultra-wideband (UWB) device) that is integrated into the vehicle. The UWB device may be located in and may be a part of the vehicle. A driver of the vehicle may have another wireless device, such as a user equipment (UE) that can communicate with a network entity. Passengers in the vehicle may also have UEs that can communicate with the network entity.

A UE may have a safety feature that enables a do-not-disturb (DND) while driving feature on the UE, when the UE moves at a rate of speed that is determined to be a vehicle speed. The goal of the DND feature is to allow the driver to focus on driving and to avoid distractions caused by incoming communications or notifications on the UE. However, the DND feature does not distinguish between a driver's UE and a passenger's UE, which may also have the DND feature that can be activated. If the DND feature on the passenger's UE is activated when the vehicle is moving, even though the passenger is not driving, the disabling of some communicative or entertainment features on the passenger's UE will cause the passenger's UE experience to degrade.

Various aspects relate generally to wireless communications associated with a vehicle. Some aspects more specifically relate to a controlling system or an infotainment system of a vehicle that distinguishes between a driver's UE and a passenger's UE based at least in part on UE locations within the vehicle. For example, the UWB device in the vehicle may perform UWB ranging and determine a location of each UE in or near the vehicle based at least in part on UWB ranging responses by the UEs. If a UE is located in a driver area of the vehicle, the UWB device may transmit a DND indication to the driver's UE to enable a DND feature. The driver area may include a region within a boundary (e.g., circular) with a diameter of X centimeters (cm)/meters (m) around a steering wheel of the vehicle. As passenger UEs are not in the driver area, the passenger UEs do not receive the DND indication.

Particular aspects of the subject matter described in this disclosure can be implemented to realize one or more of the following potential advantages. By identifying a location of a driver's UE for enabling the DND feature, the system enables the driver to operate the vehicle more safely and with less distraction than if the driver did not have the DND feature activated. Meanwhile, the passengers may enjoy full use of their UEs.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

UWB technology may be used to transmit signals with wide bandwidth (e.g., >500 MHz). Signal energy may be transmitted without interfering with narrowband and carrier wave transmission in the same frequency band. UWB may be used for low-energy, short-range applications, e.g., for ranging. UWB is presently divided into channels 1-15 spanning frequencies from about 3.5 GHz to about 4.5 GHz and from about 6.5 GHz to about 10 GHz.

While aspects may be described herein using terminology commonly associated with UWB and 5G or NR radio access technology (RAT), aspects of the present disclosure can be applied to other RATs, such as Institute of Electrical Engineers (IEEE) standards (e.g., IEEE 802), the Bluetooth® standards as defined by the Bluetooth Special Interest Group (SIG), a 3G RAT, a 4G RAT, and/or a RAT subsequent to 5G (e.g., 6G).

FIG. 1 is a diagram illustrating an example of a wireless communication network 100, in accordance with the present disclosure. The wireless communication network 100 may be or may include elements of a 4G (e.g., Long Term Evolution (LTE)) network, a 5G (or NR) network, a 6G network, wide local area network (WLAN) access points (APs), personal area network (PAN) access points and devices, or UWB devices (e.g., UWB anchor, UWB tag), among other examples. The wireless network 100 may include one or more network entities, such as a base station, AP, or UWB device 110 (shown as BS, AP, or UWB device 110*a*, pico BS, AP, or UWB device 110*b*, femto BS, AP, or UWB device 110*c*, and a relay BS, AP, or UWB device 110*d*). The wireless network 100 may also include a UE 120 or multiple UEs 120 (shown as a UE 120*a*, a UE 120*b*, a UE 120*c*, a UE 120*d*, and a UE 120*e*). A base station, AP, or UWB device 110 is a network entity that communicates with UEs 120. A base station (sometimes referred to as a BS) may include, for example, an NR base station, an LTE base station, a Node B, an eNB (e.g., in 4G), a gNB (e.g., in 5G), and/or a transmission reception point (TRP). Each base station, AP, or UWB device 110 may provide communication coverage for a particular geographic area. In the Third Generation Partnership Project (3GPP), the term "cell" can refer to a coverage area of a base station, AP, or UWB device 110 and/or a base station subsystem serving this coverage area, depending on the context in which the term is used.

The UWB devices 110, APs, base stations, and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include UWB RAT, a WLAN RAT, a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHZ), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A base station, AP, or UWB device 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the BS, AP, or UWB device 110*a* may be a macro base station, AP, or UWB device for a macro cell 102*a*, the BS, AP, or UWB device 110*b* may be a pico base station, AP, or UWB device for a pico cell 102*b*, and the BS, AP, or UWB device 110*c* may be a femto base station, AP, or UWB device for a femto cell 102*c*. A base station may support one or multiple (e.g., three) cells. A network entity may be a macro base station, a pico base station, or a femto base station.

In some examples, a cell may not necessarily be stationary, and the geographic area of the cell may move according to the location of a base station that is mobile (e.g., a mobile base station). In some examples, the base stations, APs, or UWB devices 110 may be interconnected to one another and/or to one or more other base stations, APs, or UWB devices 110 or network entities (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS, AP, or UWB device 110*d* (e.g., a relay base station) may communicate with the BS, AP, or UWB device 110*a* (e.g., a macro base station, AP, UWB device) and the UE 120*d* in order to facilitate communication between the BS, AP, or UWB device 110*a* and the UE 120*d*. A base station that relays communications may be referred to as a relay station, a relay base station, a relay, or the like.

The wireless network 100 may be a heterogeneous network that includes base stations of different types, such as macro base stations, pico base stations, femto base stations, relay base stations, or the like. These different types of base stations, different types of APs, or different types of UWB devices may have different transmit power levels, different coverage areas, and/or different impacts on interference in the wireless network 100. For example, macro base stations, APs, or UWB devices may have a high transmit power level (e.g., 5 to 40 watts) whereas pico base stations, APs, or UWB devices, femto base stations, APs, or UWB devices, and relay base stations, APs, or UWB devices may have lower transmit power levels (e.g., 0.1 to 2 watts).

A base station may be implemented as a single physical node (for example, a single physical structure) or may be implemented as two or more physical nodes (for example, two or more distinct physical structures). For example, a base station may be a device or system that implements part of a radio protocol stack, a device or system that implements a full radio protocol stack (such as a full gNB protocol stack), or a collection of devices or systems that collectively implement the full radio protocol stack. A base station may be an aggregated network node (having an aggregated architecture), meaning that the base station may implement a full radio protocol stack that is physically and logically integrated within a single node (for example, a single physical structure) in the wireless communication network 100. For example, an aggregated network entity may consist of a single standalone base station or a single TRP that uses a full radio protocol stack to enable or facilitate communication between a UE 120 and a core network of the wireless communication network 100.

Alternatively, and as also shown, a base station may be a disaggregated network node (sometimes referred to as a disaggregated base station), meaning that the base station may implement a radio protocol stack that is physically distributed and/or logically distributed among two or more nodes in the same geographic location or in different geographic locations. For example, a disaggregated network node may have a disaggregated architecture. In some deployments, disaggregated network nodes may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The base station of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single base station may include a combination of one or more CUs, one or more DUs, and/or one or more RUs. Additionally or alternatively, a network node may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

In some examples, a network node may be, may include, or may operate as an RU, a TRP, or a base station that communicates with one or more UEs 120 via a radio access link (which may be referred to as a "Uu" link). The radio access link May include a downlink and an uplink. "Downlink" (or "DL") refers to a communication direction from a network node to a UE 120, and "uplink" (or "UL") refers to a communication direction from a UE 120 to a network node. Downlink channels may include one or more control channels and one or more data channels. A downlink control channel may be used to transmit downlink control information (DCI) (for example, scheduling information, reference signals, and/or configuration information) from a network node to a UE 120. A downlink data channel may be used to transmit downlink data (for example, user data associated with a UE 120) from a network node to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node. An uplink data channel may be used to transmit uplink data (for example, user data associated with a UE 120) from a UE 120 to a network node. Uplink control channels may include one or more physical uplink control channels (PUCCHs), and uplink data channels may include one or more physical uplink shared channels (PUSCHs). The downlink and the uplink may each include a set of resources on which the network node and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium. A UE 120 may be capable of UWB communications.

A UE 120 and/or base station, AP, or UWB device 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a base station, AP, or UWB device 110 may schedule and/or allocate resources for sidelink communications between UEs 120 in the wireless communication network 100. In some other deployments and configurations, a UE 120 (instead of a network entity) may perform, or collaborate or negotiate with one or more other UEs to perform, scheduling operations, resource selection operations, and/or other operations for sidelink communications.

In some aspects, while a UE 120 is described herein using terminology commonly associated with 3GPP, a UE 120 may also be configured to operate using other RATs, including operating according to Institute of Electrical Engineers (IEEE) standards (e.g., IEEE 802) or using UWB technologies. For example, the UE 120 may operate as an access point (AP) or a mobile station (STA) in a wireless local area network (WLAN), such as a Wi-Fi network. The WLAN can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be).

A single AP and an associated set of STAs may be referred to as a basic service set (BSS), which is managed by the respective AP that serves a basic service area (BSA) of the WLAN. The BSS may be identified to users by a service set identifier (SSID), as well as to other devices by a basic service set identifier (BSSID), which may be a MAC address of the AP. An AP and STAs may transmit and receive wireless communications to and from one another in the form of physical layer convergence protocol (PLCP) protocol data units (PPDUs). The AP and the STA may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the AP and STAs may communicate in other frequency bands, such as the 6.0 GHz band, which may support both licensed and unlicensed communications. The AP and STAs may also be configured to communicate over other frequency bands such as shared licensed frequency bands, where multiple operators may have a license to operate in the same or overlapping frequency band or bands.

In some aspects, a first wireless device (e.g., a UWB device 110, an AP) may include a communication manager 150. As described in more detail elsewhere herein, the communication manager 150 may transmit a first UWB ranging signal; receive a first UWB response from a second wireless device. The communication manager 150 may transmit an indication to enable DND on the second wireless device based at least in part on a first determination, from the first UWB response, that the second wireless device is in a driver area of a vehicle. Additionally, or alternatively, the communication manager 150 may perform one or more other operations described herein.

In some aspects, a second wireless device (e.g., a UE 120, a STA) may include a communication manager 140. As described in more detail elsewhere herein, the communication manager 140 may receive a first UWB ranging signal. The communication manager 140 may transmit a first UWB response to a first wireless device; and receive an indication to enable DND. Additionally, or alternatively, the communication manager 140 may perform one or more other operations described herein.

As indicated above, FIG. 1 is provided as an example. Other examples may differ from what is described with regard to FIG. 1.

Figure 2:
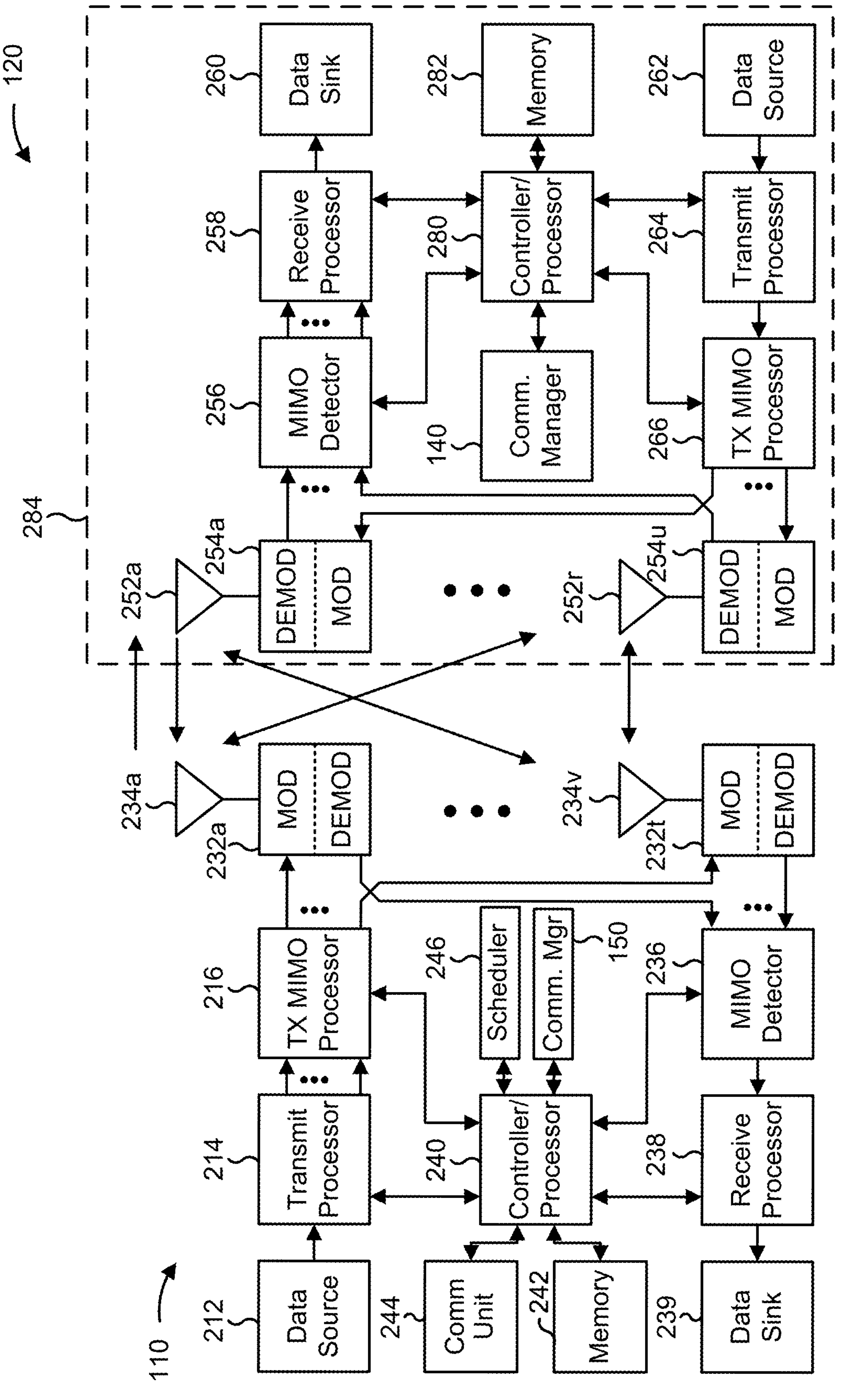
FIG. 2 is a diagram illustrating an example of a network entity in communication with a user equipment (UE) in a wireless network, in accordance with the present disclosure.

FIG. 2 is a diagram illustrating an example of a network entity (e.g., base station, AP, or UWB device 110) in communication with a UE 120 in a wireless network 100, in accordance with the present disclosure.

As shown in FIG. 2, the base station, AP, or UWB device 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the base station, AP, or UWB device 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the base station, AP, or UWB device 110 may include one or more interfaces, communication components, and/or other components that facilitate communication with the UE 120 or another network node. A WAN access point may also include components as described for the base station, AP, or UWB device 110 and may also operate in accordance with IEEE standards (e.g., IEEE 802). At the base station, AP, or UWB device 110, a transmit processor 214 may receive data, from a data source 212, intended for the UE 120 (or a set of UEs 120).

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the base station, AP, or UWB device 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the base station, AP, or UWB device 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The base station, AP, or UWB device 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the base station, AP, or UWB device 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the base station, AP, or UWB device 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the base station, AP, or UWB device 110 to the UE 120, the set of antennas 252 may receive the downlink communications or signals from the base station, AP, or UWB device 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the base station, AP, or UWB device 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network entity.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems **254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120**) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or a base station, AP, or UWB device 110 may include different numbers of antenna elements. For example, a UE 120 may include a single antenna element, two antenna elements, four antenna elements, eight antenna elements, or a different number of antenna elements. As another example, a network node may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

A controller/processor of a network entity (e.g., the controller/processor 240 of a UWB device 110 or an AP), the controller/processor 280 of the UE 120, and/or any other component(s) of FIG. 2 may perform one or more techniques associated with enabling a DND feature, as described in more detail elsewhere herein. In some aspects, the second wireless device described herein is the UE 120, is included in the UE 120, or includes one or more components of the UE 120 shown in FIG. 2. In some aspects, the first wireless device described herein is the AP or UWB device 110, is included in the AP or UWB device 110, or includes one or more components of the AP or UWB device 110 shown in FIG. 2. For example, the controller/processor 240 of the AP or UWB device 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a first wireless device (e.g., a UWB device 110, an AP) includes means for transmitting a first UWB ranging signal; means for receiving a first UWB response from a second wireless device; and/or means for transmitting an indication to enable DND on the second wireless device based at least in part on a first determination, from the first UWB response, that the second wireless device is in a driver area of a vehicle. In some aspects, the means for the first wireless device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

In some aspects, a second wireless device (e.g., a UE 120, a STA) includes means for receiving a first UWB ranging signal; means for transmitting a first UWB response to a first wireless device; and/or means for receiving an indication to enable DND. In some aspects, the means for the second wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3:
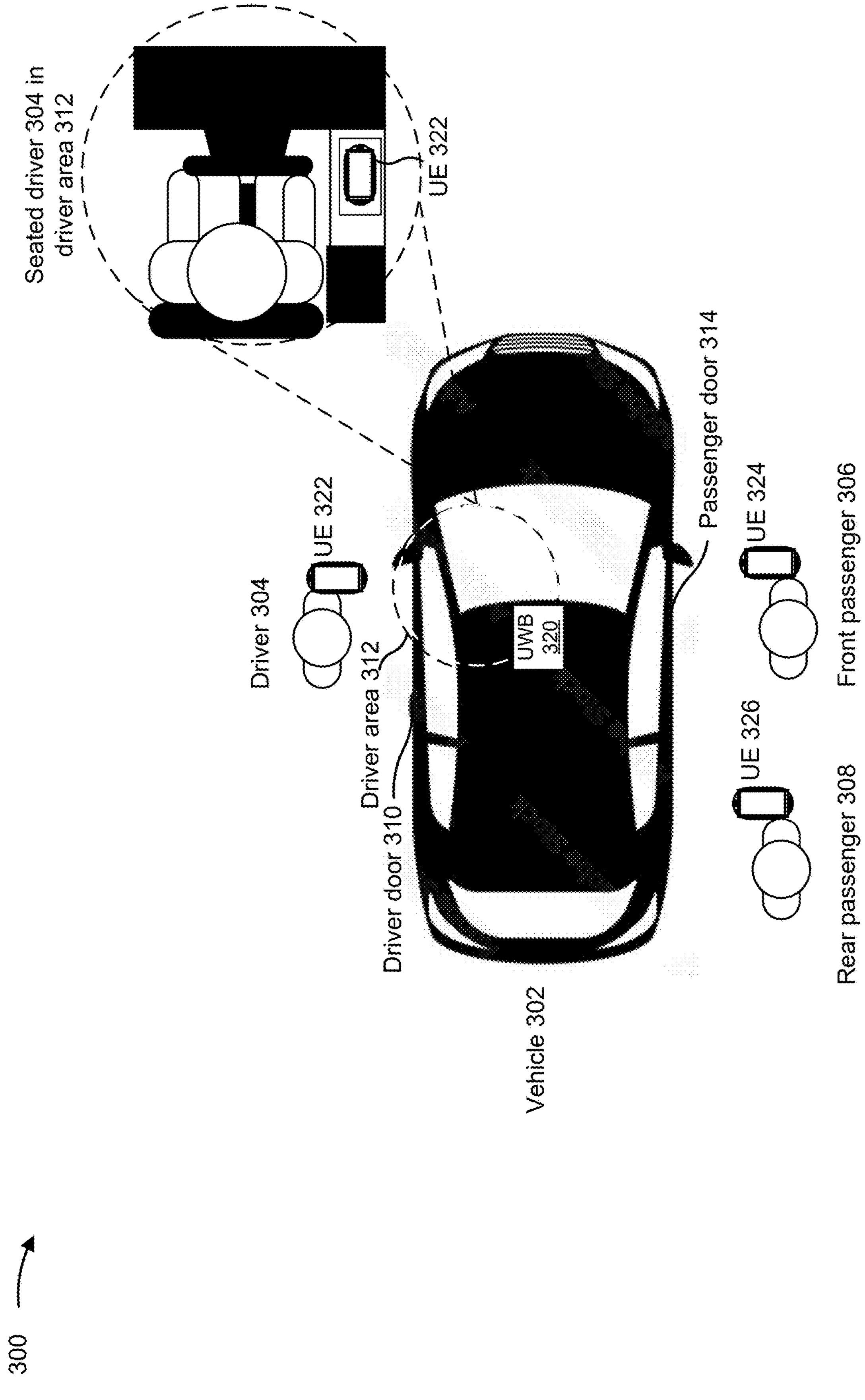
FIG. 3 is a diagram illustrating an example of enabling a do-not-disturb (DND) feature, in accordance with the present disclosure.

FIG. 3 is a diagram illustrating an example 300 of enabling a DND feature, in accordance with the present disclosure.

A vehicle 302 may include a system that offers various features, such as audio, video, navigation, internet access, or the use of other applications. Such a system may provide both information and entertainment, and thus may be referred to as an "infotainment system." The infotainment system may include or may be coupled to a wireless device (e.g., UWB device 320) that is integrated into the vehicle 302. The UWB device 320 may be located in and may be a part of the vehicle 302, and thus the vehicle 302 may be considered to have telematics. The vehicle 302 may provide power to the UWB device 320, provide a user interface for operating the UWB device 320, and offer applications or features that utilize the UWB device 320. A driver 304 of the vehicle 302 may have another wireless device, such as a UE 322. The driver 304 may make calls and communicate with other devices via a network entity (e.g., base station), which may be part of a wireless network. A front passenger 306 in the vehicle 302 may also have a UE 324 that can communicate with the network entity. There may be a rear passenger 308 in the vehicle 302 that may also have a UE 326 that can communicate with the network entity.

The UWB device 320 integrated in the vehicle 302 may detect that the driver's UE 322 is associated with the vehicle 302. A wireless device may be associated with the vehicle 302 if the wireless device is located in the vehicle 302, is connected to the vehicle 302 (e.g., via a wireless connection or a wired connection), provides a notification to the wireless device 322, or is preconfigured to be associated with the system of the vehicle 302.

A UE may have a safety feature that enables a DND while driving feature on the UE when the UE moves a rate of speed that is determined to be a vehicle speed. The goal of the DND feature is to allow the driver to focus on driving and to avoid distractions caused by incoming communications or notifications on the UE. However, the DND feature does not distinguish between a driver's UE and a passenger's UE, which may also have the DND feature. If the passenger's UE has a DND feature that is activated when the vehicle is moving, even though the passenger is not having to attend to driving safely, the passenger experience may suffer when some communicative or entertainment features are disabled on the passenger's UE.

According to various aspects described herein, a controlling system or an infotainment system of a vehicle may distinguish between a driver's UE and a passenger's UE based at least in part on UE locations within the vehicle. For example, the UWB device 320 in the vehicle 302 may perform UWB ranging and determine a location of each UE in or near the vehicle 302 based at least in part on UWB ranging responses by the UEs. If a UE is located in a driver area 312 of the vehicle 302, the UWB device 320 may transmit a DND indication to the driver's UE 322 to enable a DND feature. As passenger UEs 324 and 326 are not in the driver area 312, UEs 324 and 326 do not receive the DND indication. By identifying a location of a driver's UE for enabling the DND feature, the system enables the driver to operate the vehicle 302 more safely and with less distraction than if the driver did not have the DND feature activated. Meanwhile, the passengers may enjoy full use of their UEs. If any of the passengers were to be a driver later (e.g., front passenger 306), the UWB device 320 may transmit a DND indication to activate the DND feature on UE 324 of the new driver when UE 324 enters the driver area (and the vehicle 302 begins to move). The DND feature may be also be deactivated on the UE 322 of the former driver.

In some aspects, the UWB device 320 may determine a UE to be a driver's UE based at least in part on a location of the UE (determined through a UWB ranging session) being associated with passing through a doorway of a driver door 310. The UWB device 320 may determine a UE to be a passenger UE if a location of the UE is associated with passing through a doorway of a front passenger door 314 (non-driver side) or a rear door.

As indicated above, FIG. 3 is provided as an example. Other examples may differ from what is described with regard to FIG. 3.

Figure 4:
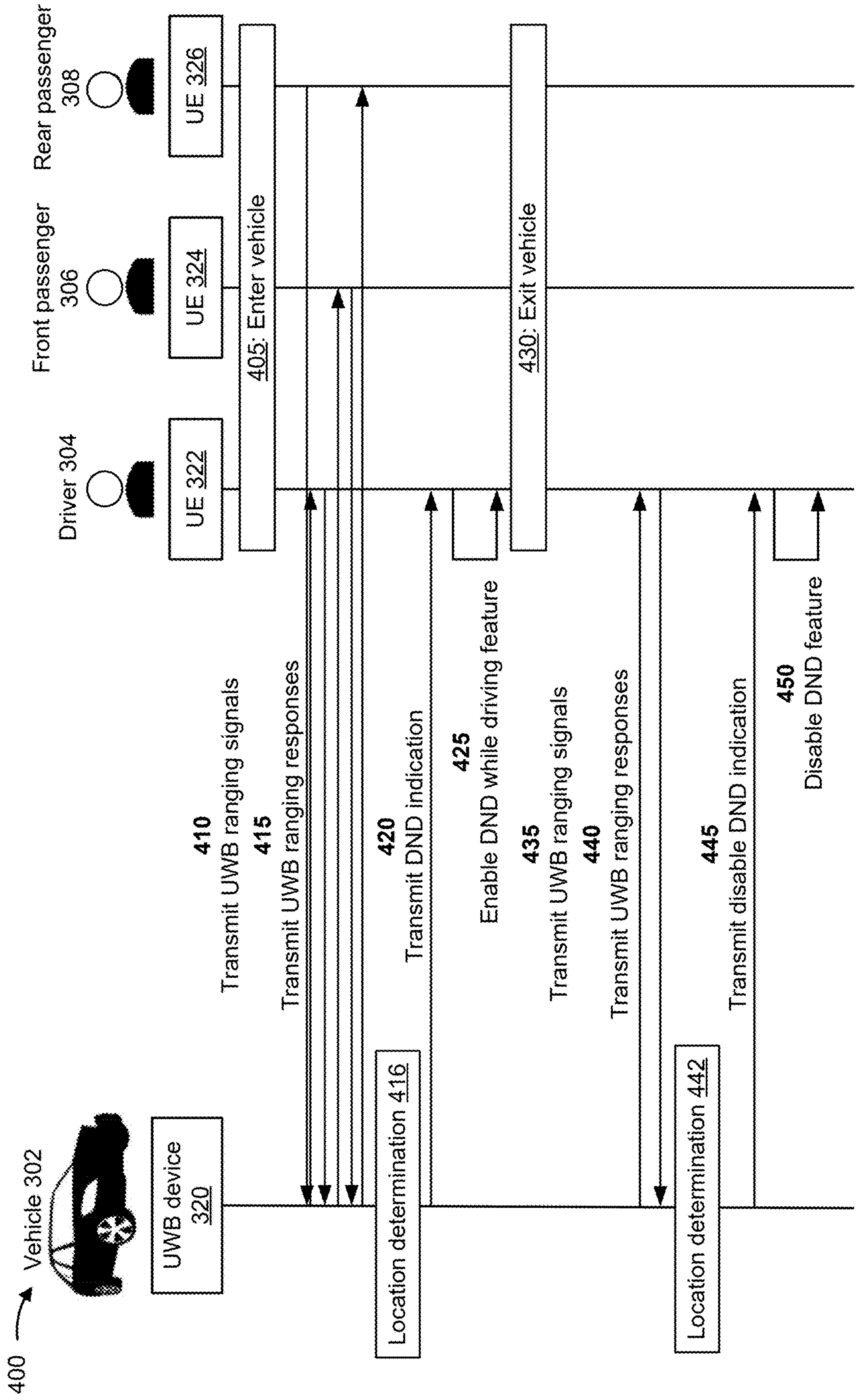
FIG. 4 is a diagram illustrating an example associated with enabling the DND feature only for a driver UE, in accordance with the present disclosure.

FIG. 4 is a diagram illustrating an example 400 associated with enabling the DND feature only for a driver UE, in accordance with the present disclosure. As shown in example 400, the UWB device 320 of the vehicle 302 may communicate and/or be associated with UE 322, UE 324, and UE 326.

As shown by reference number 405, the driver 304 and the passengers 306 and 308 may enter the vehicle 302. As shown by reference number 410, the UWB device 320 may transmit UWB ranging signals to the UE 322 of the driver 304 and the UEs 324 and 326 of the passengers 306 and 308. As shown by reference number 415, the UEs may transmit respective UWB responses for the UWB ranging signals. The UWB device 320 may make a location determination 416 for each UE (e.g., identify the device that belongs to the driver). The location determination 416 may include locations that are accurate to within 10 centimeters (cm). The UWB device 320 may be configured with vehicle information for the driver area 312. The UWB device 320 may determine that UE 322 of the driver 304 is in the driver area 312 of the vehicle 302 and that the other UEs are not in the driver area 312. As shown by reference number 420, the UWB device 320 may transmit a DND indication to UE 322 based at least in part on the location determination 416. As shown by reference number 425, UE 322 may enable the DND feature to be active while the driver 304 is driving. The DND feature for UE 322 may activate when the vehicle 302 is moving and deactivate when the vehicle 302 is not moving. In some aspects, the UWB device 320 may refrain from transmitting a DND indication to passenger UEs 324 and 326 based at least in part on the location determination 416. As a result, the driver 304 may drive more safely.

The driver 304 may stop driving. As shown by reference number 430, the driver 304 and the passengers 306 and 308 may exit the vehicle. In some aspects, the UWB device 320 may transmit UWB ranging signals, as shown by reference number 435, and receive UWB ranging responses, as shown by reference number 440. The UWB device 320 may make another location determination 442 that UE 322 has left the driver area 312. As shown by reference number 445, the UWB device 320 may transmit a disable DND indication so that UE 322 does not activate the DND feature while the driver 304 is walking or doing other activities. As shown by reference number 450, UE 322 may disable the DND feature. Alternatively, in some aspects, the UWB device 320 may transmit the disable DND indication when the vehicle 302 is in park or turned off. In some aspects, UE 322 may disable the DND feature based at least in part on a manual entry by the driver 304 into UE 322. In some aspects, UE 322 may disable the DND feature automatically based at least in part on other criteria (e.g., user activity, position, orientation, or movement consistent with having exited the vehicle).

As indicated above, FIG. 4 is provided as an example. Other examples may differ from what is described with regard to FIG. 4.

Figure 5:
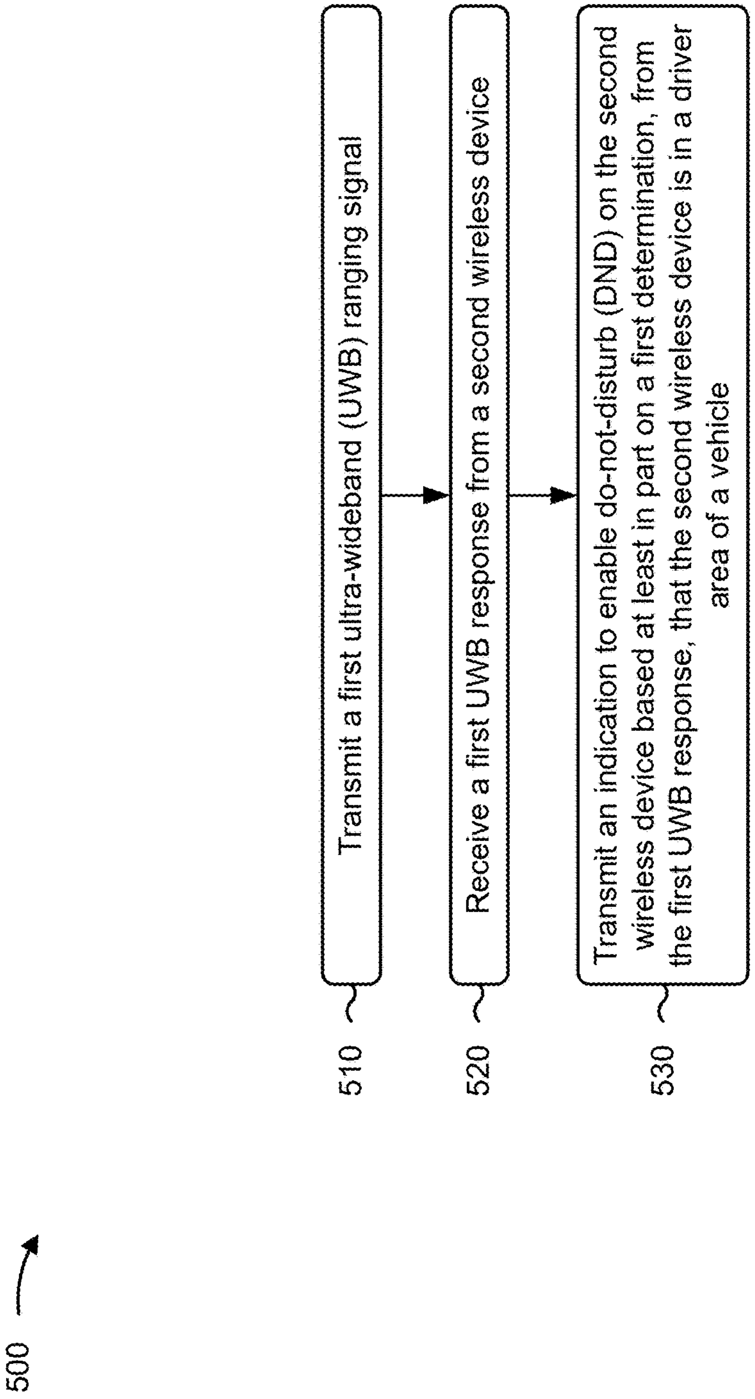
FIG. 5 is a diagram illustrating an example process performed, for example, at a first wireless device or an apparatus of a first wireless device, in accordance with the present disclosure.

FIG. 5 is a diagram illustrating an example process 500 performed, for example, at a first wireless device or an apparatus of a first wireless device, in accordance with the present disclosure. Example process 500 is an example where the apparatus or the first wireless device (e.g., UWB device 110, UWB device 320) performs operations associated with UWB ranging for DND in a vehicle.

As shown in FIG. 5, in some aspects, process 500 may include transmitting a first UWB ranging signal (block 510). For example, the first wireless device (e.g., using transmission component 704 and/or communication manager 706, depicted in FIG. 7) may transmit a first UWB ranging signal, as described above.

As further shown in FIG. 5, in some aspects, process 500 may include receiving a first UWB response from a second wireless device (block 520). For example, the first wireless device (e.g., using reception component 702 and/or communication manager 706, depicted in FIG. 7) may receive a first UWB response from a second wireless device, as described above.

As further shown in FIG. 5, in some aspects, process 500 may include transmitting an indication to enable DND on the second wireless device based at least in part on a first determination, from the first UWB response, that the second wireless device is in a driver area of a vehicle (block 530). For example, the first wireless device (e.g., using transmission component 704 and/or communication manager 706, depicted in FIG. 7) may transmit an indication to enable DND on the second wireless device based at least in part on a first determination, from the first UWB response, that the second wireless device is in a driver area of a vehicle, as described above.

Process 500 may include additional aspects, such as any single aspect or any combination of aspects described below and/or in connection with one or more other processes described elsewhere herein.

In a first aspect, the first wireless device is a UWB node coupled to the vehicle.

In a second aspect, alone or in combination with the first aspect, the first determination is based at least in part on a first location, derived from the first UWB response, that is in the driver area.

In a third aspect, alone or in combination with one or more of the first and second aspects, the first determination is based at least in part on a first location, derived from the first UWB response, that is associated with the second wireless device entering through a doorway of a driver door of the vehicle.

In a fourth aspect, alone or in combination with one or more of the first through third aspects, process 500 includes transmitting a second UWB ranging signal, receiving a second UWB response from the second wireless device, and transmitting an indication to disable DND on the second wireless device based at least in part on a second determination, from the second UWB response, that the second wireless device has exited the driver area.

In a fifth aspect, alone or in combination with one or more of the first through fourth aspects, the second determination is based at least in part on a second location, derived from the second UWB response, that is outside the driver area.

In a sixth aspect, alone or in combination with one or more of the first through fifth aspects, the second determination is based at least in part on a second location, derived from the second UWB response, that is associated with the second wireless device exiting through a driver door of the vehicle.

In a seventh aspect, alone or in combination with one or more of the first through sixth aspects, process 500 includes receiving a second UWB response from a third wireless device, determining that the third wireless device is in a front passenger area or a rear passenger area of the vehicle based at least in part on a second location, derived from the second UWB response, that is associated with the front passenger area, the rear passenger area, or the second wireless device entering from a non-driver side of the vehicle, and refraining from transmitting the indication to enable DND to the third wireless device.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
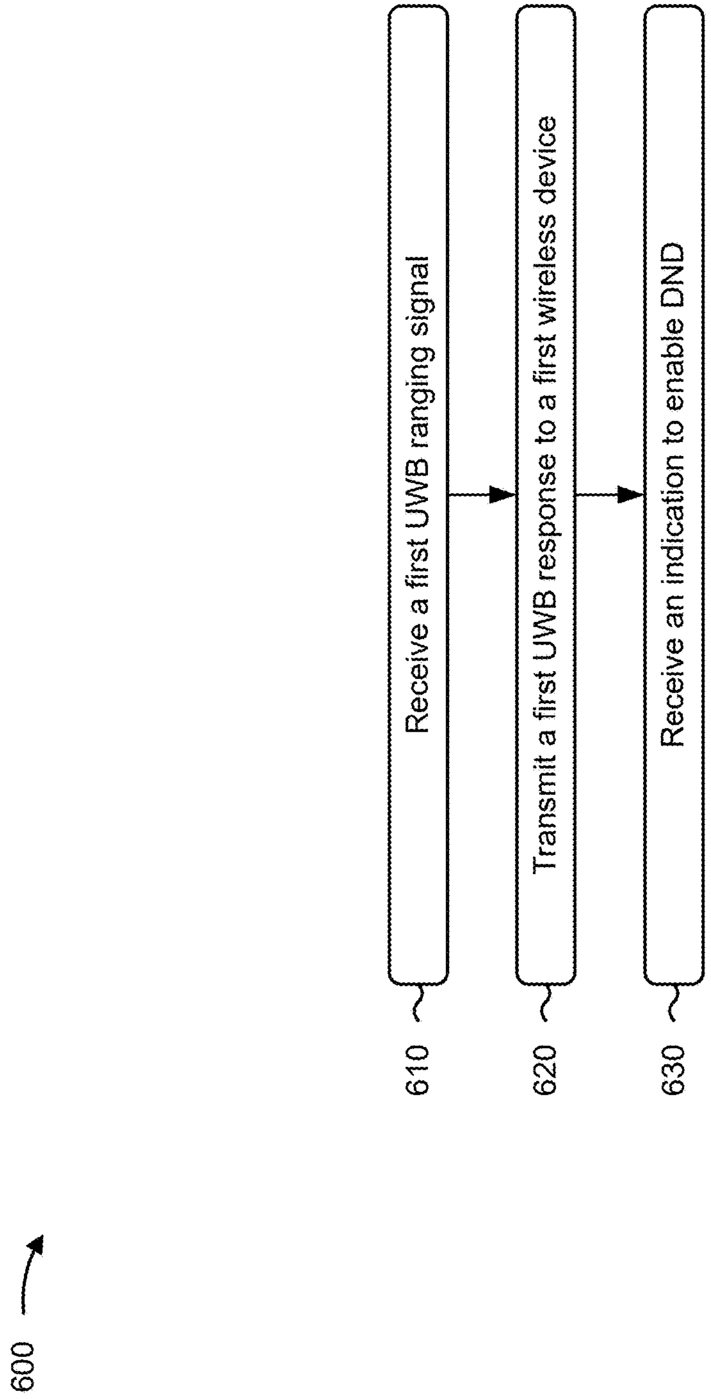
FIG. 6 is a diagram illustrating an example process performed, for example, at a second wireless device or an apparatus of a second wireless device, in accordance with the present disclosure.

FIG. 6 is a diagram illustrating an example process 600 performed, for example, at a second wireless device or an apparatus of a second wireless device, in accordance with the present disclosure. Example process 600 is an example where the apparatus or the second wireless device (e.g., UE 120, UE 322) performs operations associated with UWB ranging for DND in vehicle.

As shown in FIG. 6, in some aspects, process 600 may include receiving a first UWB ranging signal (block 610). For example, the second wireless device (e.g., using reception component 802 and/or communication manager 806, depicted in FIG. 8) may receive a first UWB ranging signal, as described above.

As further shown in FIG. 6, in some aspects, process 600 may include transmitting a first UWB response to a first wireless device (block 620). For example, the second wireless device (e.g., using transmission component 804 and/or communication manager 806, depicted in FIG. 8) may transmit a first UWB response to a first wireless device, as described above.

As further shown in FIG. 6, in some aspects, process 600 may include receiving an indication to enable DND (block 630). For example, the second wireless device (e.g., using reception component 802 and/or communication manager 806, depicted in FIG. 8) may receive an indication to enable DND, as described above.

Process 600 may include additional aspects, such as any single aspect or any combination of aspects described below and/or in connection with one or more other processes described elsewhere herein.

In a first aspect, the first wireless device is a UWB node coupled to a vehicle.

In a second aspect, alone or in combination with the first aspect, process 600 includes receiving a second UWB ranging signal, transmitting a second UWB response to the first wireless device, and receiving an indication to disable DND on the second wireless device.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
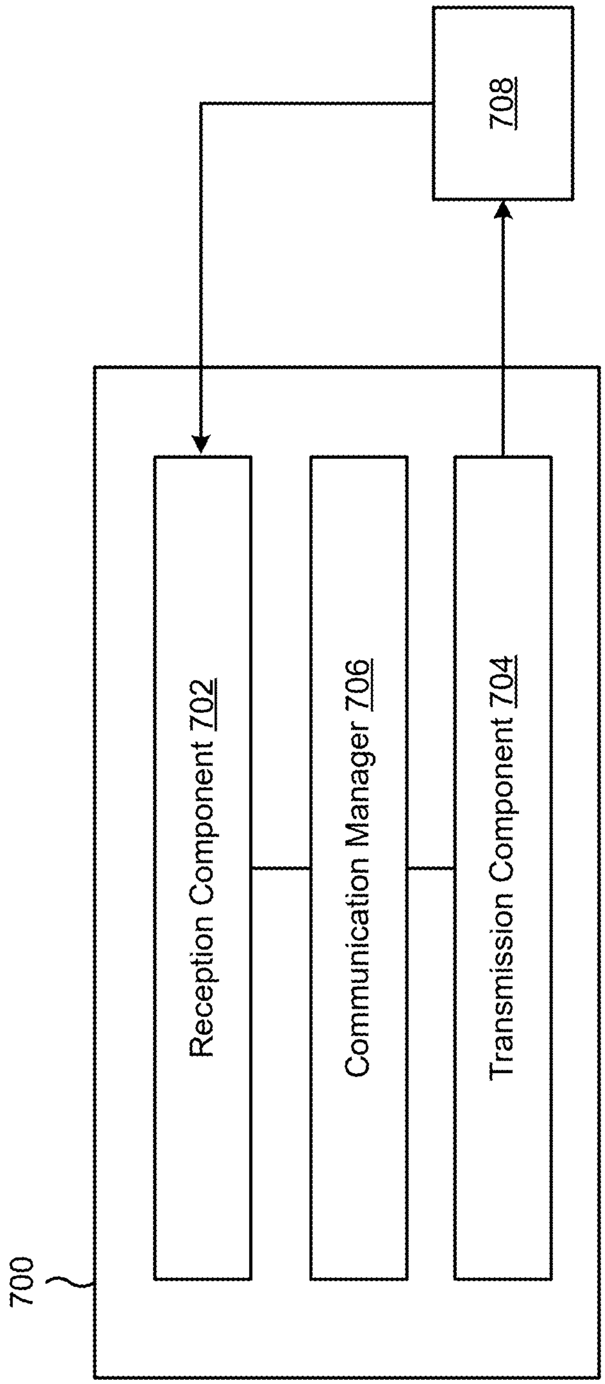
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a first wireless device, or a first wireless device may include the apparatus 700. In some aspects, the apparatus 700 includes a reception component 702, a transmission component 704, and/or a communication manager 706, which may be in communication with one another (for example, via one or more buses and/or one or more other components). In some aspects, the communication manager 706 is the communication manager 150 described in connection with FIG. 1. As shown, the apparatus 700 may communicate with another apparatus 708, such as a UE or a network node (such as a CU, a DU, an RU, or a base station), using the reception component 702 and the transmission component 704.

In some aspects, the apparatus 700 may be configured to perform one or more operations described herein in connection with FIGS. 1-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the first wireless device described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 702 may receive communications, such as reference signals, control information, data communications, or a combination thereof, from the apparatus 708. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, one or more modems, one or more demodulators, one or more MIMO detectors, one or more receive processors, one or more controllers/processors, one or more memories, or a combination thereof, of the first wireless device described in connection with FIG. 2.

The transmission component 704 may transmit communications, such as reference signals, control information, data communications, or a combination thereof, to the apparatus 708. In some aspects, one or more other components of the apparatus 700 may generate communications and may provide the generated communications to the transmission component 704 for transmission to the apparatus 708. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 704 may include one or more antennas, one or more modems, one or more modulators, one or more transmit MIMO processors, one or more transmit processors, one or more controllers/processors, one or more memories, or a combination thereof, of the first wireless device described in connection with FIG. 2. In some aspects, the transmission component 704 may be co-located with the reception component 702 in one or more transceivers.

The communication manager 706 may support operations of the reception component 702 and/or the transmission component 704. For example, the communication manager 706 may receive information associated with configuring reception of communications by the reception component 702 and/or transmission of communications by the transmission component 704. Additionally, or alternatively, the communication manager 706 may generate and/or provide control information to the reception component 702 and/or the transmission component 704 to control reception and/or transmission of communications.

The transmission component 704 may transmit a first UWB ranging signal. The reception component 702 may receive a first UWB response from a second wireless device. The transmission component 704 may transmit an indication to enable DND on the second wireless device based at least in part on a first determination, from the first UWB response, that the second wireless device is in a driver area of a vehicle.

The transmission component 704 may transmit a second UWB ranging signal. The reception component 702 may receive a second UWB response from the second wireless device. The transmission component 704 may transmit an indication to disable DND on the second wireless device based at least in part on a second determination, from the second UWB response, that the second wireless device has exited the driver area.

The reception component 702 may receive a second UWB response from a third wireless device. The communication manager 706 may determine that the third wireless device is in a front passenger area or a rear passenger area of the vehicle based at least in part on a second location, derived from the second UWB response, that is associated with the front passenger area, the rear passenger area, or the second wireless device entering from a non-driver side of the vehicle. The communication manager 706 may refrain from transmitting the indication to enable DND to the third wireless device.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
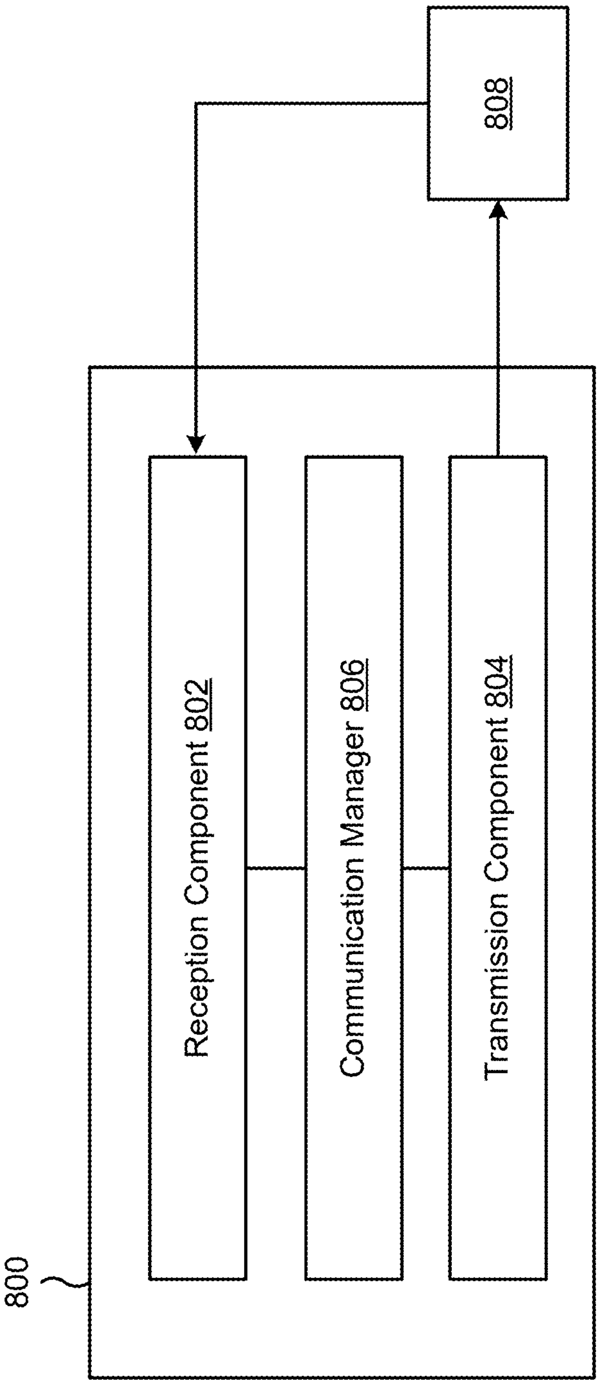
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a second wireless device, or a second wireless device may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 1-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the second wireless device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the second wireless device described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the second wireless device described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive a first UWB ranging signal. The transmission component 804 may transmit a first UWB response to a first wireless device. The reception component 802 may receive an indication to enable DND.

The reception component 802 may receive a second UWB ranging signal. The transmission component 804 may transmit a second UWB response to the first wireless device. The reception component 802 may receive an indication to disable DND on the second wireless device.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first wireless device, comprising: transmitting a first ultra-wideband (UWB) ranging signal; receiving a first UWB response from a second wireless device; and transmitting an indication to enable do-not-disturb on the second wireless device based at least in part on a first determination, from the first UWB response, that the second wireless device is in a driver area of a vehicle.

Aspect 2: The method of Aspect 1, wherein the first wireless device is a UWB node coupled to the vehicle.

Aspect 3: The method of any of Aspects 1-2, wherein the first determination is based at least in part on a first location, derived from the first UWB response, that is in the driver area.

Aspect 4: The method of any of Aspects 1-3, wherein the first determination is based at least in part on a first location, derived from the first UWB response, that is associated with the second wireless device entering through a driver door of the vehicle.

Aspect 5: The method of any of Aspects 1-4, further comprising: transmitting a second UWB ranging signal; receiving a second UWB response from the second wireless device; and transmitting an indication to disable do-not-disturb on the second wireless device based at least in part on a second determination, from the second UWB response, that the second wireless device has exited the driver area.

Aspect 6: The method of Aspect 5, wherein the second determination is based at least in part on a second location, derived from the second UWB response, that is outside the driver area.

Aspect 7: The method of Aspect 5, wherein the second determination is based at least in part on a second location, derived from the second UWB response, that is associated with the second wireless device exiting through a driver door of the vehicle.

Aspect 8: The method of any of Aspects 1-7, further comprising: receiving a second UWB response from a third wireless device; determining that the third wireless device is in a front passenger area or a rear passenger area of the vehicle based at least in part on a second location, derived from the second UWB response, that is associated with the front passenger area, the rear passenger area, or the second wireless device entering from a non-driver side of the vehicle; and refraining from transmitting the indication to enable do-not-disturb to the third wireless device.

Aspect 9: A method of wireless communication performed by a second wireless device, comprising: receiving a first ultra-wideband (UWB) ranging signal; transmitting a first UWB response to a first wireless device; and receiving an indication to enable do-not-disturb.

Aspect 10: The method of Aspect 9, wherein the first wireless device is a UWB node coupled to a vehicle.

Aspect 11: The method of any of Aspects 9-10, further comprising: receiving a second UWB ranging signal; transmitting a second UWB response to the first wireless device; and receiving an indication to disable do-not-disturb on the second wireless device.

Aspect 12: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-11.

Aspect 13: An apparatus for wireless communication at a device, the apparatus comprising one or more memories and one or more processors coupled to the one or more memories, the one or more processors configured to cause the device to perform the method of one or more of Aspects 1-11.

Aspect 14: An apparatus for wireless communication, the apparatus comprising at least one means for performing the method of one or more of Aspects 1-11.

Aspect 15: A non-transitory computer-readable medium storing code for wireless communication, the code comprising instructions executable by one or more processors to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

Aspect 17: A device for wireless communication, the device comprising a processing system that includes one or more processors and one or more memories coupled with the one or more processors, the processing system configured to cause the device to perform the method of one or more of Aspects 1-11.

Aspect 18: An apparatus for wireless communication at a device, the apparatus comprising one or more memories and one or more processors coupled to the one or more memories, the one or more processors individually or collectively configured to cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a first wireless device, comprising:
- one or more memories; and
- one or more processors, coupled to the one or more memories, individually or collectively configured to cause the first wireless device to:
  - transmit a first ultra-wideband (UWB) ranging signal;
  - receive a first UWB response from a second wireless device; and
  - transmit an indication to enable do-not-disturb on the second wireless device based at least in part on a first determination, from the first UWB response, that the second wireless device is in a driver area of a vehicle, wherein the first determination is based at least in part on a first location, derived from the first UWB response, that is associated with the second wireless device entering through a doorway of a driver door of the vehicle.

2. The apparatus of claim 1, wherein the first wireless device is a UWB node coupled to the vehicle.

3. The apparatus of claim 1, wherein the first determination is based at least in part on a first location, derived from the first UWB response, that is in the driver area.

4. The apparatus of claim 1, wherein the one or more processors are individually or collectively configured to cause the first wireless device to:
- transmit a second UWB ranging signal;
- receive a second UWB response from the second wireless device; and
- transmit an indication to disable do-not-disturb on the second wireless device based at least in part on a second determination, from the second UWB response, that the second wireless device has exited the driver area.

5. The apparatus of claim 4, wherein the second determination is based at least in part on a second location, derived from the second UWB response, that is outside the driver area.

6. The apparatus of claim 4, wherein the second determination is based at least in part on a second location, derived from the second UWB response, that is associated with the second wireless device exiting through a driver door of the vehicle.

7. The apparatus of claim 1, wherein the one or more processors are individually or collectively configured to cause the first wireless device to:
- receive a second UWB response from a third wireless device;
- determine that the third wireless device is in a front passenger area or a rear passenger area of the vehicle based at least in part on a second location, derived from the second UWB response, that is associated with the front passenger area or the rear passenger area; and refrain from transmitting the indication to enable do-not-disturb to the third wireless device.

8. The apparatus of claim 1, wherein the one or more processors are individually or collectively configured to cause the first wireless device to:

receive a second UWB response from a third wireless device;

determine that the third wireless device is in a front passenger area or a rear passenger area of the vehicle based at least in part on a second location, derived from the second UWB response, that is associated with the third wireless device entering from a non-driver door of the vehicle; and refrain from transmitting the indication to enable do-not-disturb to the third wireless device.

9. An apparatus for wireless communication at a second wireless device, comprising:

one or more memories; and one or more processors, coupled to the one or more memories, individually or collectively configured to cause the second wireless device to:

receive a first ultra-wideband (UWB) ranging signal;

transmit a first UWB response to a first wireless device; and receive an indication to enable do-not-disturb, wherein the indication is based at least in part on a first location associated with the second wireless device entering through a doorway of a driver door of a vehicle.

10. The apparatus of claim 9, wherein the first wireless device is a UWB node coupled to a vehicle.

11. The apparatus of claim 9, wherein the one or more processors are individually or collectively configured to cause the second wireless device to:

receive a second UWB ranging signal;

transmit a second UWB response to the first wireless device; and receive an indication to disable do-not-disturb on the second wireless device.

12. A method of wireless communication performed by a first wireless device, comprising:

transmitting a first ultra-wideband (UWB) ranging signal;

receiving a first UWB response from a second wireless device; and transmitting an indication to enable do-not-disturb on the second wireless device based at least in part on a first determination, from the first UWB response, that the second wireless device is in a driver area of a vehicle, wherein the first determination is based at least in part on a first location, derived from the first UWB response, that is associated with the second wireless device entering through a doorway of a driver door of the vehicle.

13. The method of claim 12, wherein the first wireless device is a UWB node coupled to the vehicle.

14. The method of claim 12, wherein the first determination is based at least in part on a first location, derived from the first UWB response, that is in the driver area.

15. The method of claim 12, further comprising:

transmitting a second UWB ranging signal;

receiving a second UWB response from the second wireless device; and transmitting an indication to disable do-not-disturb on the second wireless device based at least in part on a second determination, from the second UWB response, that the second wireless device has exited the driver area.

16. The method of claim 15, wherein the second determination is based at least in part on a second location, derived from the second UWB response, that is outside the driver area.

17. The method of claim 15, wherein the second determination is based at least in part on a second location, derived from the second UWB response, that is associated with the second wireless device exiting through a driver door of the vehicle.

18. The method of claim 12, further comprising:

receiving a second UWB response from a third wireless device;

determining that the third wireless device is in a front passenger area or a rear passenger area of the vehicle based at least in part on a second location, derived from the second UWB response, that is associated with the front passenger area or the rear passenger area; and refraining from transmitting the indication to enable do-not-disturb to the third wireless device.

19. The method of claim 12, further comprising:

receiving a second UWB response from a third wireless device;

determining that the third wireless device is in a front passenger area or a rear passenger area of the vehicle based at least in part on a second location, derived from the second UWB response, that is associated with the third wireless device entering from a non-driver door of the vehicle; and refraining from transmitting the indication to enable do-not-disturb to the third wireless device.

* * * * *